US011741824B2

(12) United States Patent
Tsuge

(10) Patent No.: US 11,741,824 B2
(45) Date of Patent: Aug. 29, 2023

(54) VEHICLE WITH EMERGENCY REPORTING FUNCTION

(71) Applicant: SUBARU CORPORATION, Tokyo (JP)

(72) Inventor: Masatoshi Tsuge, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/855,266

(22) Filed: Jun. 30, 2022

(65) Prior Publication Data

US 2023/0023067 A1 Jan. 26, 2023

(30) Foreign Application Priority Data

Jul. 21, 2021 (JP) ................................. 2021-120771

(51) Int. Cl.
  *G08B 25/10* (2006.01)
  *H04W 4/90* (2018.01)
  *B60W 40/08* (2012.01)
  *B60W 40/12* (2012.01)

(52) U.S. Cl.
  CPC ............ *G08B 25/10* (2013.01); *B60W 40/08* (2013.01); *B60W 40/12* (2013.01); *H04W 4/90* (2018.02); *B60W 2040/0881* (2013.01)

(58) Field of Classification Search
  CPC ....... G08B 25/10; B60W 40/08; B60W 40/12; B60W 2040/0881; H04W 4/90
  See application file for complete search history.

(56) References Cited

U.S. PATENT DOCUMENTS

| 7,861,817 | B2 * | 1/2011 | Ueno | B60R 21/0132 |
| | | | | 180/274 |
| 9,462,615 | B2 * | 10/2016 | Dettloff | H04W 4/90 |
| 11,040,657 | B2 * | 6/2021 | Ohara | B60R 11/04 |
| 11,172,347 | B2 * | 11/2021 | D'Addetta | G06F 17/18 |
| 2018/0029553 | A1 | 2/2018 | Hamakami | |
| 2020/0307481 | A1 * | 10/2020 | Yezersky | B60R 21/013 |
| 2021/0291871 | A1 * | 9/2021 | Yoshida | B60W 50/0205 |
| 2022/0038859 | A1 * | 2/2022 | Nagasawa | H04W 4/90 |
| 2022/0103994 | A1 * | 3/2022 | Nagasawa | H04W 4/90 |

FOREIGN PATENT DOCUMENTS

| JP | 11-219488 A | 8/1999 |
| WO | 2016/170610 A1 | 10/2016 |

* cited by examiner

*Primary Examiner* — John A Tweel, Jr.
(74) *Attorney, Agent, or Firm* — McDermott Will & Emery LLP

(57) ABSTRACT

A vehicle with an emergency reporting function includes a processor, a vehicle communication device, a first calling device, and a vehicle outside occupant detector. The processor determines, by means of the vehicle outside occupant detector, whether an occupant who has been present inside the vehicle before an emergency is present inside the vehicle or outside the vehicle after the emergency. If the occupant is present inside the vehicle after the emergency, the processor uses the first calling device to enable a communication between an occupant inside the vehicle and an operator terminal. If the occupant is present outside the vehicle after the emergency, the processor additionally uses a second calling device to enable a communication between an occupant present outside or inside the vehicle and the operator terminal. The second calling device allows for a communication outside the vehicle.

12 Claims, 8 Drawing Sheets

| PATTERN | VEHICLE INSIDE CAPTURED IMAGE | | VEHICLE OUTSIDE CAPTURED IMAGE | OCCUPANT INSIDE/OUTSIDE INFORMATION |
|---|---|---|---|---|
| | BEFORE ACCIDENT | AFTER ACCIDENT | | |
| 1 | DRIVER | DRIVER | NOT DETERMINED | OCCUPANT INSIDE VEHICLE = DRIVER<br>OCCUPANT OUTSIDE VEHICLE = NONE<br>MISSING OCCUPANT = NONE |
| 2 | DRIVER | ABSENT | MATCHING WITH DRIVER | OCCUPANT INSIDE VEHICLE = NONE<br>OCCUPANT OUTSIDE VEHICLE = DRIVER<br>MISSING OCCUPANT = NONE |
| 3 | DRIVER | ABSENT | NO MATCHING | OCCUPANT INSIDE VEHICLE = NONE<br>OCCUPANT OUTSIDE VEHICLE = NONE<br>MISSING OCCUPANT = DRIVER |

FIG. 6

| PATTERN | VEHICLE INSIDE CAPTURED IMAGE | | VEHICLE OUTSIDE CAPTURED IMAGE | OCCUPANT INSIDE/OUTSIDE INFORMATION |
|---|---|---|---|---|
| | BEFORE ACCIDENT | AFTER ACCIDENT | | |
| 11 | DRIVER PASSENGER | DRIVER PASSENGER | NOT DETERMINED | OCCUPANT INSIDE VEHICLE = DRIVER AND PASSENGER<br>OCCUPANT OUTSIDE VEHICLE = NONE<br>MISSING OCCUPANT = NONE |
| 12 | DRIVER PASSENGER | PASSENGER | MATCHING WITH DRIVER | OCCUPANT INSIDE VEHICLE = PASSENGER<br>OCCUPANT OUTSIDE VEHICLE = DRIVER<br>MISSING OCCUPANT = NONE |
| 13 | DRIVER PASSENGER | PASSENGER | NO MATCHING | OCCUPANT INSIDE VEHICLE = PASSENGER<br>OCCUPANT OUTSIDE VEHICLE = NONE<br>MISSING OCCUPANT = DRIVER |

FIG. 7

| PATTERN | VEHICLE INSIDE CAPTURED IMAGE | | VEHICLE OUTSIDE CAPTURED IMAGE | DOOR OPENING AND CLOSING | OCCUPANT INSIDE/OUTSIDE INFORMATION |
| --- | --- | --- | --- | --- | --- |
| | BEFORE ACCIDENT | AFTER ACCIDENT | | | |
| 21 | DRIVER PASSENGER | DRIVER PASSENGER | NOT DETERMINED | NOT DETERMINED | OCCUPANT INSIDE VEHICLE = DRIVER AND PASSENGER OCCUPANT WHO HAS VOLUNTARILY GOT OUT = NONE OCCUPANT WHO HAS BEEN THROWN OUT = NONE MISSING OCCUPANT = NONE |
| 22 | DRIVER PASSENGER | PASSENGER | MATCHING WITH DRIVER | DRIVER'S SEAT : DETECTED OTHER SEAT(S) : UNDETECTED | OCCUPANT INSIDE VEHICLE = PASSENGER OCCUPANT WHO HAS VOLUNTARILY GOT OUT = DRIVER OCCUPANT WHO HAS BEEN THROWN OUT = NONE MISSING OCCUPANT = NONE |
| 23 | DRIVER PASSENGER | PASSENGER | MATCHING WITH DRIVER | DRIVER'S SEAT : UNDETECTED OTHER SEAT(S) : UNDETECTED | OCCUPANT INSIDE VEHICLE = PASSENGER OCCUPANT WHO HAS VOLUNTARILY GOT OUT = NONE OCCUPANT WHO HAS BEEN THROWN OUT = DRIVER MISSING OCCUPANT = NONE |
| 24 | DRIVER PASSENGER | PASSENGER | NO MATCHING | NOT DETERMINED | OCCUPANT INSIDE VEHICLE = PASSENGER OCCUPANT WHO HAS VOLUNTARILY GOT OUT = NONE OCCUPANT WHO HAS BEEN THROWN OUT = NONE MISSING OCCUPANT = DRIVER |

FIG. 8

VEHICLE WITH EMERGENCY REPORTING FUNCTION

CROSS-REFERENCE TO RELATED APPLICATIONS

The present application claims priority from Japanese Patent Application No. 2021-120771 filed on Jul. 21, 2021, the entire contents of which are hereby incorporated by reference.

BACKGROUND

The technology relates to a vehicle with an emergency reporting function.

A vehicle, such as an automobile, can come into collision with another automobile while traveling, or an occupant of the automobile can feel sick. In this case, the automobile makes an emergency report to an operator of an emergency support center. For example, reference is made to Japanese Unexamined Patent Application Publication No. H11-219488 and International Publication No. WO 2016/170610.

In response to an emergency report, the operator of the emergency support center makes a dispatch request of a dispatch team. The dispatch team rushes to a site where the automobile that has made the emergency report is present by an emergency vehicle, for example, to execute an emergency response.

This enables the automobile and the occupant involved in an emergency to receive the emergency response.

SUMMARY

An aspect of the technology provides a vehicle with an emergency reporting function. The vehicle includes a processor, a vehicle communication device, a first vehicle inside calling device, and a vehicle outside occupant detector. The processor is configured to generate an emergency report to be transmitted to an operator terminal in a case where an emergency involving the vehicle occurs. The vehicle communication device is configured to be coupled to the operator terminal to transmit the emergency report generated by the processor. The first calling device is provided in the vehicle to be used by an occupant present inside the vehicle. The vehicle outside occupant detector is configured to perform detection that an occupant of the vehicle is present outside the vehicle. On the basis of the detection by the vehicle outside occupant detector, the processor is configured to perform determination as to whether an occupant who has been present inside the vehicle before occurrence of the emergency is present inside the vehicle or outside the vehicle after the occurrence of the emergency. The processor is configured to use the first calling device to enable a communication between an occupant inside the vehicle and the operator terminal, in a case where the occupant who has been present inside the vehicle before the occurrence of the emergency is present inside the vehicle after the occurrence of the emergency. The processor is configured to use a second calling device, together with the first calling device, to enable a communication between an occupant present outside or inside the vehicle and the operator terminal, in a case where the occupant who has been present inside the vehicle before the occurrence of the emergency is present outside the vehicle after the occurrence of the emergency. The second calling device is configured to allow for a communication outside the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 6 is an explanatory diagram illustrating occupant inside/outside information assuming a case where only a driver is riding the automobile and an emergency due to an accident occurs.

FIG. 7 is an explanatory diagram illustrating the occupant inside/outside information assuming a case where the driver and a passenger are riding the automobile and an emergency due to an accident occurs.

FIG. 8 is an explanatory diagram illustrating the occupant inside/outside information including opening and closing detection of a door of the automobile assuming the case where the driver and the passenger are riding the automobile and an emergency due to an accident occurs.

DETAILED DESCRIPTION

In an emergency response, it is desired to take an action or a measure corresponding to details of an emergency. Even if emergency response personnel rushes to a site, it is difficult for the emergency response personnel to immediately start the emergency response if a shortage of equipment, for example, is found after arrival at the site.

For a more appropriate emergency response, it is thus desired that, before making a dispatch request of a dispatch team, an operator of an emergency support center talk, by phone, with an occupant of a vehicle from which an emergency report has been received. The operator may inquire about details and a degree of an emergency and inform the dispatch team, which makes it possible to prevent an event in which emergency response personnel who has rushed to a site is unable to immediately start an emergency response.

For such a talk, basically having only information on a vehicle involved in an emergency, the operator may place an outgoing call to the vehicle involved in the emergency by using an operator terminal, to couple the operator terminal to a vehicle inside calling device of the vehicle involved in the emergency.

On the other hand, an occupant of the vehicle involved in the emergency does not necessarily stay inside the vehicle after occurrence of the emergency. The occupant can escape out of the vehicle involved in an accident, or the occupant can be thrown out of the vehicle due to impact of the accident. Under these situations, even if the operator terminal is coupled to the vehicle inside calling device of the vehicle involved in the emergency, the operator is unable to talk with the occupant of the vehicle involved in the emergency.

It is desirable to provide a vehicle with an emergency reporting function that more reliably enables a phone call to be made between an occupant and an operator.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
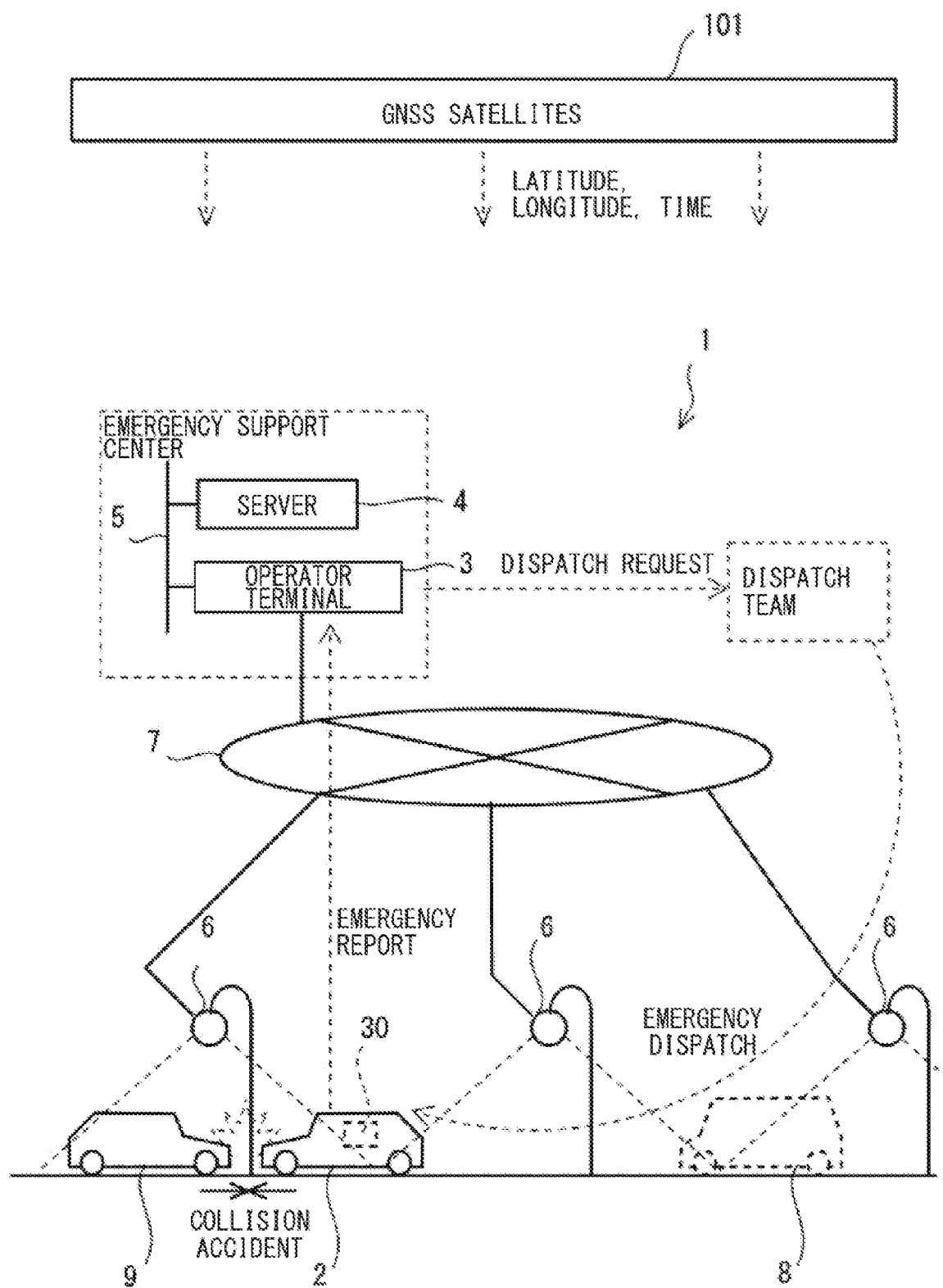
FIG. 1 is an explanatory diagram illustrating an automatic emergency reporting system for an automobile, according to one example embodiment of the technology.

FIG. 1 is an explanatory diagram illustrating an automatic emergency reporting system 1 for an automobile 2, according to an example embodiment of the technology.

The automatic emergency reporting system 1 illustrated in FIG. 1 may include the automobile 2 supporting the system, and an operator terminal 3 of an emergency support center.

At the emergency support center, the operator terminal 3 may be coupled to a communication network 7 and to a local area network 5 of the emergency support center. A server 4 may be coupled to the local area network 5.

The automobile 2 (hereinafter also referred to as an own vehicle) is an example of a vehicle that is able to travel while carrying an occupant. A control system 30 of the automobile 2 may establish, via a mobile communicator 33 to be described later, a communication path with a base station 6 among a plurality of base stations 6. The base station 6 may include, in its zone, a road on which the automobile 2 travels. The plurality of base stations 6 may be coupled to the communication network 7. The base station 6 and the communication network 7 may be a 5G base station and a 5G communication network provided by a carrier. In another example, the base station 6 and the communication network 7 may be an advanced driver assistance system (ADAS)-dedicated base station and an ADAS-dedicated communication network provided by, for example, a public institution.

The automobile 2 has an emergency reporting function. The automobile 2 can come into collision with another automobile 9 while traveling, or an occupant, such as an owner who drives the automobile 2, can feel sick. The owner may be, for example, a driver. In a case where the automobile 2 is thus involved in an emergency, the control system 30 of the automobile 2 may make an emergency report to the operator terminal 3 of the emergency support center from the mobile communicator 33 to be described later, through the base station 6 and the communication network 7.

An operator of the emergency support center may check the emergency report received by the operator terminal 3, and make a dispatch request of a dispatch team. The dispatch team may rush to a site where the automobile 2 that has made the emergency report is present, by an emergency vehicle 8, to execute an emergency response.

This enables the automobile 2 and the occupant involved in the emergency to receive the emergency response executed by the dispatch team.

In an emergency response, it is desired to take an action or a measure corresponding to details of an emergency. Even if emergency response personnel rushes to a site, it is difficult for the emergency response personnel to immediately start the emergency response if a shortage of equipment, for example, is found after arrival at the site.

For a more appropriate emergency response, it may thus be desired that, before making a dispatch request of a dispatch team, an operator of an emergency support center talk, by phone, with the occupant of the automobile 2 from which an emergency report has been received. The operator may inquire about details and a degree of an emergency and inform the dispatch team, which makes it possible to prevent an event in which emergency response personnel who has rushed to a site is unable to immediately start an emergency response.

For such a talk, basically having only information on the automobile 2 involved in an emergency, the operator may place an outgoing call to the automobile 2 involved in the emergency by using the operator terminal 3, to couple the operator terminal 3 to a vehicle inside calling device of the automobile 2 involved in the emergency.

On the other hand, an occupant of the automobile 2 involved in the emergency does not necessarily stay inside the vehicle after occurrence of the emergency. The occupant can escape out of the automobile 2 involved in an accident, or the occupant can be thrown out of the automobile 2 due to impact of the accident. Under these situations, even if the operator terminal 3 is coupled to the vehicle inside calling device of the automobile 2 involved in the emergency, the operator is unable to talk with the occupant of the automobile 2 involved in the emergency.

As described above, it may be desired to improve the automatic emergency reporting system 1 based on an emergency report made by the automobile 2.

Figure 2:
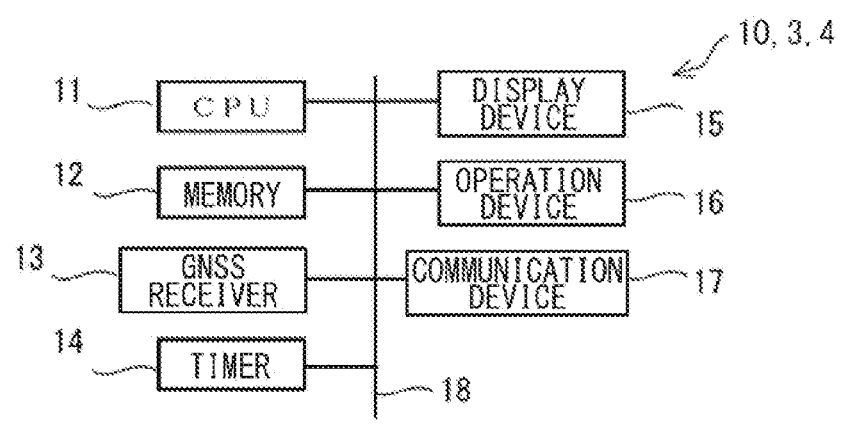
FIG. 2 is an explanatory diagram illustrating a computer that may be used as a server or an operator terminal illustrated in FIG. 1.

FIG. 2 is an explanatory diagram illustrating a computer 10 that may be used as the server 4 or the operator terminal 3 illustrated in FIG. 1.

The computer 10 illustrated in FIG. 2 may include a central processing unit (CPU) 11, a memory 12, a global navigation satellite system (GNSS) receiver 13, a timer 14, a display device 15, an operation device 16, and the communication device 17. Note that the computer 10 serving as the server 4 may include the CPU 11, the memory 12, the GNSS receiver 13, the timer 14, and the communication device 17. The computer 10 serving as the operator terminal 3 may include an unillustrated microphone and an unillustrated speaker to be used for a phone call. Here, the phone call is not limited to communication via a telephone line, may include communication via a mobile data network such as the communication network 7. The phone call is not limited to communication by using voice data, and may include communication by using video data or text data or both.

The communication device 17 may be coupled to the communication network 7 and the local area network 5. In a case where the communication network 7 is coupled to the local area network 5 through a router, for example, only the local area network 5 may be directly coupled to the communication device 17. The communication device 17 may transmit and receive communication data of the computer 10.

The display device 15 may be a liquid crystal monitor, for example. The display device 15 may display a screen for the operator. Non-limiting examples of the display screen of the display device 15 may include an emergency report screen, a phone call screen, and a dispatch request screen.

The emergency report screen may be a screen that displays, for example, presence or absence of an emergency report and details of the emergency report. Non-limiting examples of the details of the emergency report may include a site, i.e., a position of the automobile 2 that has made the emergency report, a report time, and a reported or predicted state about the automobile 2 and the occupant. Presence or absence of another emergency report that is issued near the automobile 2 being displayed may also be displayed, for example.

The phone call screen may be, for example, an outgoing call screen for the automobile 2 from which the emergency report has been received or a mobile terminal of the occupant thereof.

The dispatch request screen may be a request screen for a dispatch team present near the site where an emergency has occurred.

The operation device 16 may be a keyboard, a pointing device, a touch panel, or a button, for example. The operation device 16 may be operated by the operator. The operator may operate the operation device 16 to, for example, switch the display screen of the display device 15.

The GNSS receiver 13 may receive radio waves from GNSS satellites 101 illustrated in FIG. 1, and generate a current time. The GNSS receiver 13 may obtain a position where the computer 10 is installed, together with the current time.

The timer 14 may measure a time period or a time. The time of the timer 14 may be calibrated by the current time of the GNSS receiver 13.

The memory 12 may hold a program and data to be used to cause the computer 10 to serve as the server 4 or the operator terminal 3.

The CPU 11 may read the program from the memory 12 and execute the program. This enables the CPU 11 to serve as a processor that controls overall operation of the server 4 or a processor that controls overall operation of the operator terminal 3.

The CPU 11 serving as the processor of the server 4 may transmit data from the communication device 17 in a case where an access is made from the operator terminal 3 to the communication device 17.

The CPU 11 serving as the processor of the operator terminal 3 may receive an emergency report from the automobile 2, switch the display of the display device 15 in response to the operator's operation, and execute control based on an operation on the display screen. Non-limiting examples of the control based on the operation on the display screen may include control of an outgoing call to the automobile 2 that has made the emergency report or the occupant thereof, control of accessing the server 4 to acquire information held in the memory 12 of the server 4, and control of an outgoing call to a dispatch team for a dispatch request.

Figure 3:
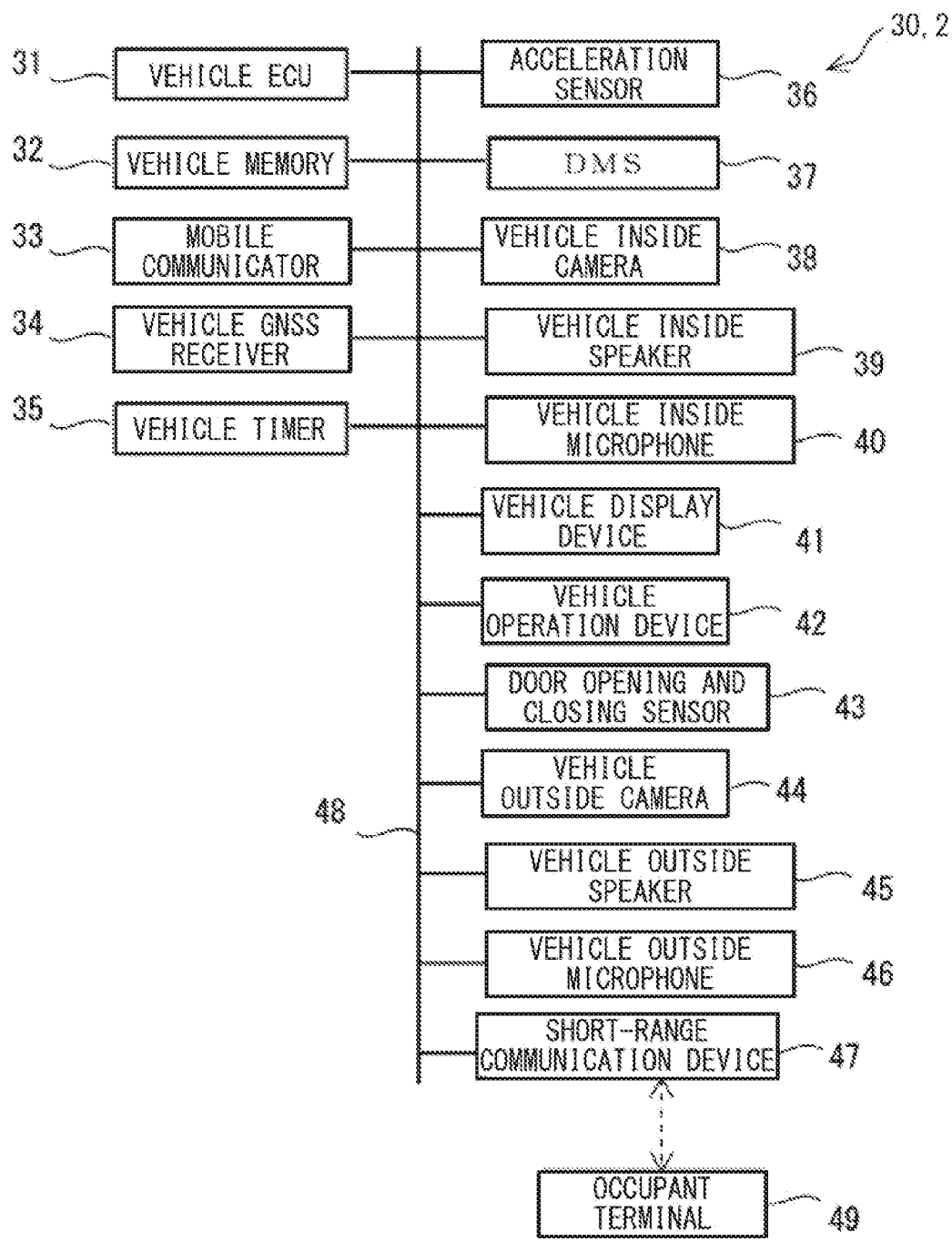
FIG. 3 is an explanatory diagram illustrating a control system of the automobile illustrated in FIG. 1.

FIG. 3 is an explanatory diagram illustrating the control system 30 of the automobile 2 illustrated in FIG. 1.

The control system 30 of the automobile 2 illustrated in FIG. 3 may include a vehicle electronic control unit (ECU) 31, a vehicle memory 32, the mobile communicator 33, a vehicle GNSS receiver 34, a vehicle timer 35, an acceleration sensor 36, an occupant monitoring device (e.g., a driver monitoring system (DMS)) 37, a vehicle inside camera 38, a vehicle inside speaker 39, a vehicle inside microphone 40, a vehicle display device 41, a vehicle operation device 42, a door opening and closing sensor 43, a vehicle outside camera 44, a vehicle outside speaker 45, a vehicle outside microphone 46, a short-range communication device 47, and a vehicle network 48 that couple these components.

The vehicle network 48 may be a wired communication network conforming to a controller area network (CAN) or a local interconnect network (LIN), for example, for the automobile 2. The vehicle network 48 may be a communication network such as a local area network (LAN), or may be a combination of such communication networks. The vehicle network 48 may partly include a wireless communication network.

The vehicle GNSS receiver 34, the vehicle timer 35, the vehicle display device 41, the vehicle operation device 42, the vehicle inside speaker 39, and the vehicle inside microphone 40 may be similar to the corresponding components of the computer 10 illustrated in FIG. 2. Note that the vehicle operation device 42 may be, for example, a touch panel that is overlayed on the vehicle display device 41. The vehicle display device 41 may display, for example, a situation of automatic driving of the automobile 2 and an emergency report screen.

The vehicle inside speaker 39 and the vehicle inside microphone 40 are provided in the automobile 2 to be used by an occupant present inside the vehicle. In one embodiment, the vehicle inside speaker 39 and the vehicle inside microphone 40 may serve as the "vehicle inside calling device". The vehicle inside calling device may include an imaging device configured to capture an image of a vehicle compartment of the automobile 2 and may be capable of video calling. The vehicle inside calling device may serve as a "first calling device".

The mobile communicator 33 may establish a communication path with the base station 6. The mobile communicator 33 may transmit and receive data to and from the communication device 17 of the operator terminal 3, through the base station 6 and the communication network 7, as a communicator of the automobile 2. In one embodiment, the mobile communicator 33 may serve as a "vehicle communication device".

The acceleration sensor 36 may detect an acceleration of the automobile 2. The acceleration sensor 36 may detect a speed of the automobile 2. A sudden stop or collision of the automobile 2 causes an acceleration higher than a usual acceleration.

The vehicle inside camera 38 may capture an image of a vehicle compartment of the automobile 2, as a vehicle inside occupant detector. The vehicle inside camera 38 may be a narrow-angle camera that captures an image of only the owner of the automobile 2, or may be a wide-angle camera that captures an image of the entire vehicle compartment. The occupant, such as the driver or a passenger, riding the automobile 2 may be imaged in a vehicle inside captured image of the vehicle inside camera 38. Processing the vehicle inside captured image of the vehicle inside camera 38 makes it is possible to distinguish or recognize the occupant riding the automobile 2. Note that the occupant riding the automobile 2 may be detected by a vehicle inside occupant detector other than the vehicle inside camera 38, for example, by a radar that outputs a millimeter wave toward the inside of the vehicle.

The occupant monitoring device 37 may identify the owner and the passenger riding the automobile 2 and monitor a state of each occupant, on the basis of the image captured by the vehicle inside camera 38. The occupant can doze, look aside, or have an abnormal heart rate. The occupant monitoring device 37 may detect an abnormality about a health state of the occupant on the basis of, for example, the abnormal heart rate.

The door opening and closing sensor 43 may detect opening and closing of a door provided on the automobile 2. In one embodiment, the door opening and closing sensor 43 may serve as an "opening and closing detection device". In a case where the automobile 2 includes a plurality of doors, such as a door on a driver's seat side and a door on a passenger seat side, the door opening and closing sensor 43 may be provided for each door. Another example of the opening and closing detection device may detect opening and closing of a window. When the occupant gets out of the automobile 2, the occupant may open and close the door. The occupant can get out through the window in emergency where the door is not openable or closable.

The vehicle outside camera 44 may capture an image of the outside of the vehicle, e.g., surroundings of the automobile 2. In one embodiment, the vehicle outside camera 44 may serve as a "vehicle outside occupant detector". The vehicle outside camera 44 may be a 360-degree camera that captures an image of the entire surroundings of the automobile 2, or may be a plurality of cameras provided toward the surroundings of the automobile 2 to have angles of view that differ from each other. In a case where an occupant who has got out of the automobile 2 or an occupant thrown out of the automobile 2 is present around the automobile 2, the vehicle outside camera 44 may capture an image of such an occupant present outside the vehicle. Processing a vehicle outside captured image of the vehicle outside camera 44 makes it possible to distinguish or recognize the occupant present outside the automobile 2. Note that the occupant present outside the automobile 2 may be detected by a vehicle outside occupant detector other than the vehicle outside camera 44, for example, by a radar that outputs a millimeter wave toward the surroundings of the automobile 2.

The vehicle outside speaker 45 may output sound toward the outside of the automobile 2.

The vehicle outside microphone 46 may detect sound outside the automobile 2.

The vehicle outside speaker 45 and the vehicle outside microphone 46 may serve as a vehicle outside calling device provided on the automobile 2 toward the outside of the vehicle. The vehicle outside calling device may include the vehicle outside camera 44 and may be capable of video calling. The vehicle outside calling device may serve as a "second calling device". An occupant present outside the automobile 2 may use the vehicle outside speaker 45 and the vehicle outside microphone 46 for a phone call outside the vehicle.

The short-range communication device 47 may be wirelessly coupled to an occupant terminal 49 possessed by an occupant by short-range communication. Non-limiting examples of a short-range communication standard may include Institute of Electrical and Electronics Engineers (IEEE) 802.15.1 and IEEE 802.11/b/g. Non-limiting examples of the occupant terminal 49 may include a mobile phone terminal, a wearable terminal, and a wireless key couplable to a carrier communication network. The short-range communication device 47 may detect, authenticate, and establish connection with the occupant terminal 49 that is possessed by the occupant riding the automobile 2 or present around the automobile 2. In a case where the occupant terminal 49 includes a speaker and a microphone, the short-range communication device 47 is able to transmit and receive phone call voice data to and from the occupant terminal 49. The occupant terminal 49 may be configured to input and output voice for a phone call.

The vehicle memory 32 may hold a program and data. Non-limiting examples of the data that is held in the vehicle memory 32 may include access information and user authentication information for the operator terminal 3 to which an emergency report is to be made, emergency report format data, and connection destination list data indicating the occupant terminal 49 to which the short-range communication device 47 is able to be coupled.

The vehicle ECU 31 may read the program from the vehicle memory 32 and execute the program. This enables the vehicle ECU 31 to serve as a processor that controls overall operation, including travel control, of the automobile 2.

The vehicle ECU 31 serving as the processor of the automobile 2 may control travel of the automobile 2 based on the automatic driving, for example.

Collision can be detected by a detection value of the acceleration sensor 36 exceeding a threshold, or an abnormality or irregularity in the health state of the occupant can be detected by the occupant monitoring device 37, for example. In such a case, the vehicle ECU 31 may generate an emergency report and automatically transmit the emergency report to the operator terminal 3 via the mobile communicator 33 on the basis of the detection.

Figure 4:
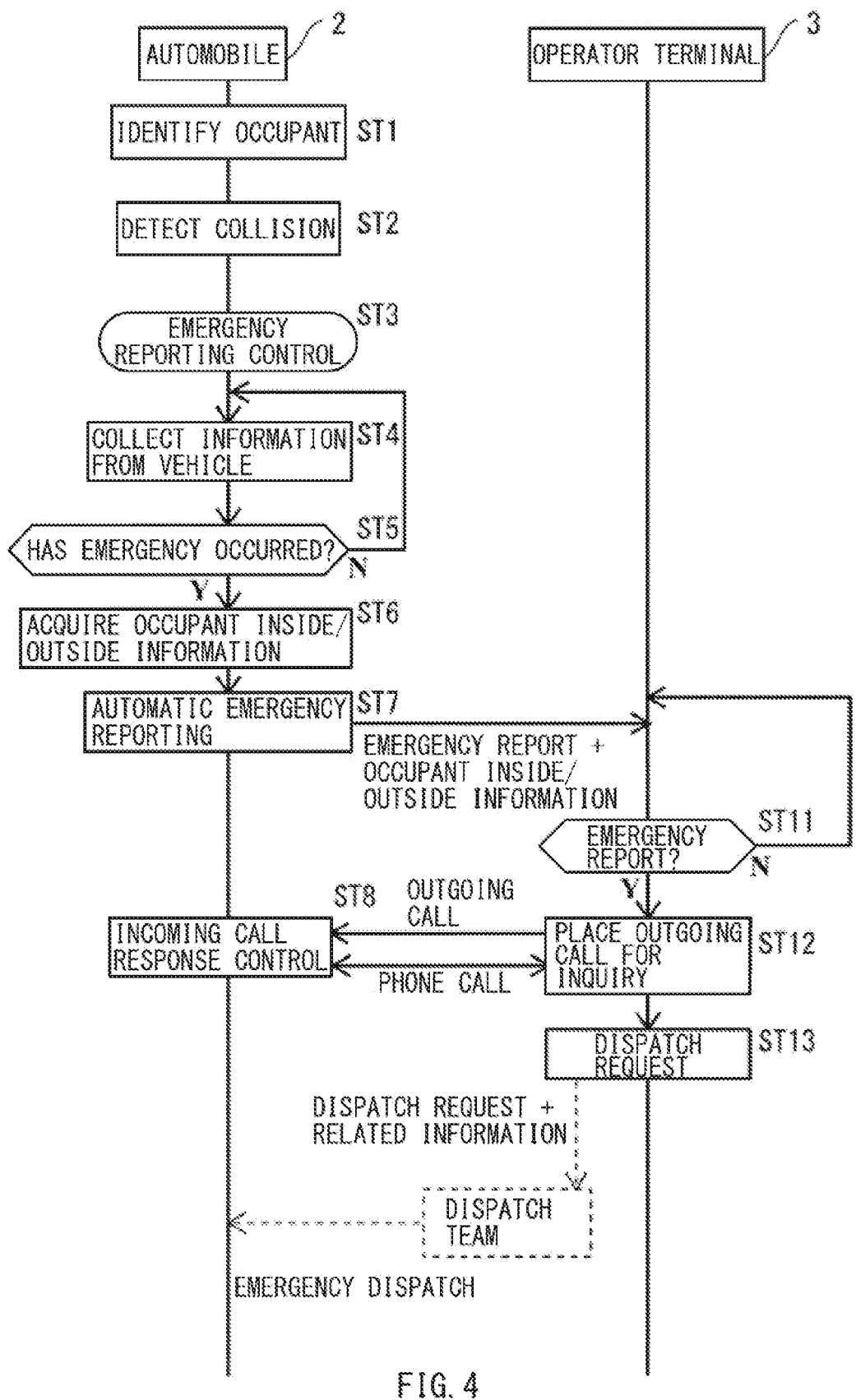
FIG. 4 is a timing chart illustrating an example flow of automatic emergency reporting in the entire automatic emergency reporting system illustrated in FIG. 1.

FIG. 4 is a timing chart illustrating an example flow of automatic emergency reporting in the entire automatic emergency reporting system 1 illustrated in FIG. 1.

FIG. 4 illustrates the automobile 2 and the operator terminal 3. Time flows from the top to the bottom.

FIG. 4 illustrates an example of emergency reporting in a case of collision of the automobile 2. Reporting in another emergency may be similar to the reporting in FIG. 4.

In step ST1, the vehicle ECU 31 of the automobile 2 may identify the occupant riding the automobile 2. The vehicle ECU 31 may identify the riding occupant, for example, on the basis of the vehicle inside captured image of the vehicle inside camera 38 by means of the occupant monitoring device 37.

In step ST2, the vehicle ECU 31 of the automobile 2 may detect collision of the automobile 2. The vehicle ECU 31 may detect the collision of the automobile 2, for example, if the detection value of the acceleration sensor 36 exceeds the threshold. The vehicle ECU 31 may detect the collision of the automobile 2 by predicting unavoidable collision of the automobile 2.

In step ST3, the vehicle ECU 31 of the automobile 2 may start emergency reporting control on the basis of the detection of the collision of the automobile 2.

In step ST4, the vehicle ECU 31 of the automobile 2 may collect information from the automobile 2. The vehicle ECU 31 may collect information about the state of the occupant after the collision detection, for example, by means of the occupant monitoring device 37. The occupant can get out of the vehicle after the collision detection, or can be thrown out of the vehicle upon the collision.

In step ST5, the vehicle ECU 31 of the automobile 2 may determine whether an emergency for which an emergency report is to be made has occurred. The vehicle ECU 31 may determine whether an emergency for which an emergency report is to be made has occurred, for example, on the basis of a degree of impact applied by the collision. If an emergency for which an emergency report is to be made has occurred (ST5: Y), the vehicle ECU 31 may cause the flow to proceed to step ST6. If an emergency for which an emergency report is to be made has not occurred (ST5: N), the vehicle ECU 31 may cause the flow to return to step ST4. This enables the vehicle ECU 31 to keep monitoring about the state after the collision detection. The vehicle ECU 31 may end this control, without causing the flow to return to step ST4, after elapse of a predetermined period.

In step ST6, the vehicle ECU 31 of the automobile 2 may acquire occupant inside/outside information to generate an emergency report. The vehicle ECU 31 may acquire the occupant inside/outside information, for example, by processing illustrated in emergency reporting control in FIG. 5 to be described later.

In step ST7, the vehicle ECU 31 of the automobile 2 may generate and transmit an emergency report. The vehicle ECU 31 may transmit the generated emergency report to the operator terminal 3 via the mobile communicator 33.

Thus, the automobile 2 can come into collision with the other automobile 9 while traveling, or the occupant can feel sick. The vehicle ECU 31 of the automobile 2 is able to detect such an event, and automatically transmit an emergency report to the operator terminal 3.

In step ST11, the CPU 11 of the operator terminal 3 may determine whether an emergency report has been received. The operator terminal 3 may receive the emergency report transmitted by the vehicle ECU 31 of the automobile 2 in step ST7. If no emergency report has been received (ST11: N), the CPU 11 of the operator terminal 3 may repeat this process. If an emergency report is received (ST11: Y), the CPU 11 of the operator terminal 3 may cause the flow to proceed to step ST12.

In step ST12, the CPU 11 of the operator terminal 3 may place an outgoing call to inquire of the occupant of the automobile 2 from which the emergency report has been received. The CPU 11 of the operator terminal 3 may place an outgoing call to the automobile 2 from which the emergency report has been received to establish connection, allowing the operator to talk by phone with the occupant of the automobile 2 from which the emergency report has been received. The vehicle ECU 31 of the automobile 2 may execute, in step ST8, incoming call response control in response to an incoming call from the operator terminal 3. The operator may inquire, by phone, of the occupant of the automobile 2 involved in the emergency about desired information, such as details and a degree of the emergency or presence or absence and a degree of injury.

In step ST13, the CPU 11 of the operator terminal 3 may make a request to dispatch a dispatch team. The CPU 11 of the operator terminal 3 may make a request to dispatch the most suitable dispatch team, on the basis of determination and an operation of the operator.

In response to the dispatch request, the dispatch team may rush to a location of the automobile 2 from which the emergency report has been received, and execute emergency response rescue work, for example.

This enables the automobile 2 and the occupant involved in the emergency to receive an emergency response.

Figure 5:
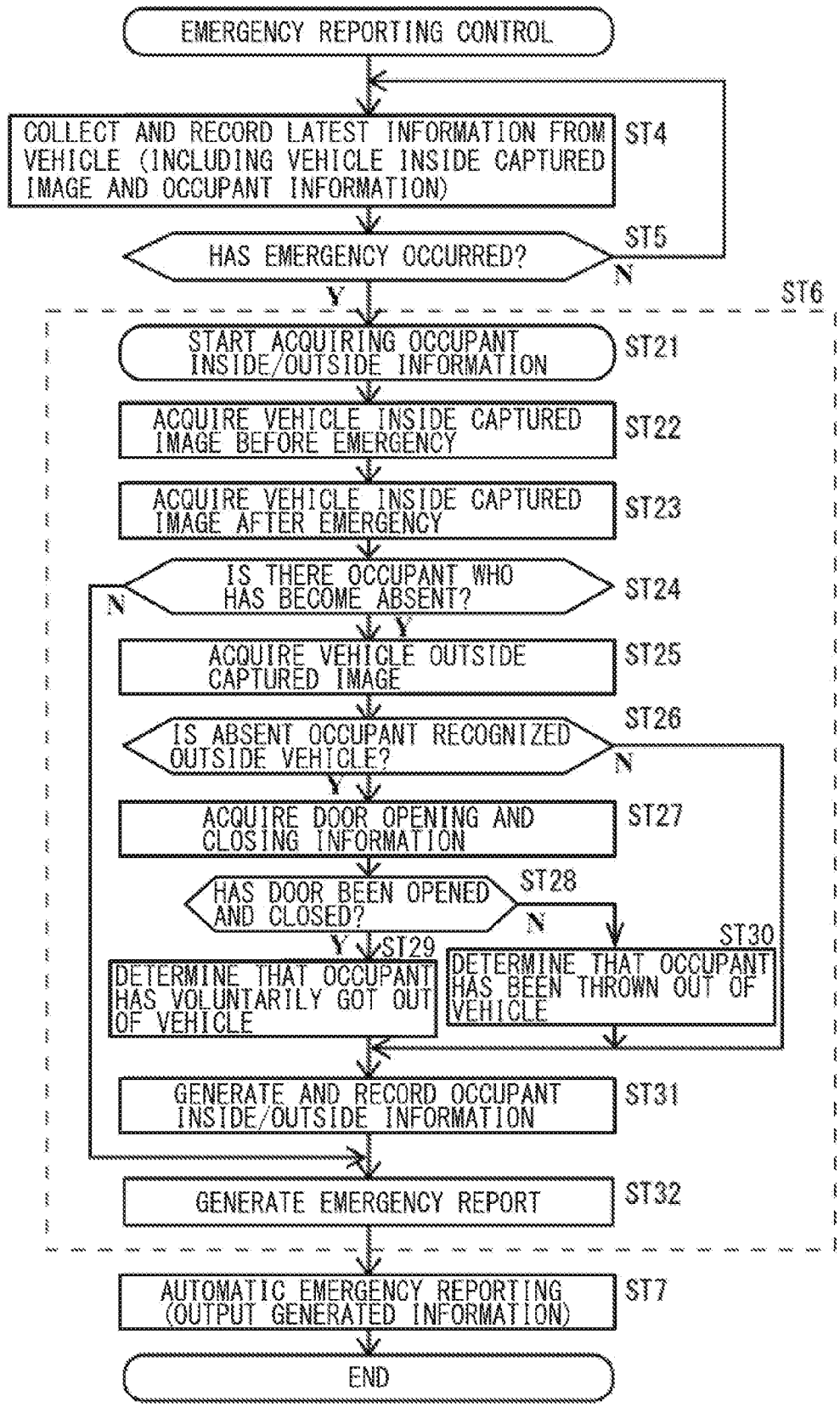
FIG. 5 is a flowchart illustrating emergency reporting control that is performed by the control system of the automobile illustrated in FIG. 1.

FIG. 5 is a flowchart illustrating the emergency reporting control that is performed by the control system 30 of the automobile 2 illustrated in FIG. 1.

The vehicle ECU 31 of the control system 30 of the automobile 2 may repeatedly execute the emergency reporting control illustrated in FIG. 5.

The overall processing from step ST4 to step ST7 may be similar to that in FIG. 4.

In step ST4, the vehicle ECU 31 may recognize an occupant present inside the vehicle before occurrence of an emergency, on the basis of a vehicle inside captured image, of the vehicle inside camera 38, before the occurrence of the emergency involving the automobile 2. The vehicle ECU 31 may record, in the vehicle memory 32, a recognition result of the occupant present inside the vehicle before the occurrence of the emergency. In one embodiment, the vehicle inside camera 38 may serve as a "vehicle inside imaging device".

If the vehicle ECU 31 determines that the automobile 2 is involved in an emergency, such as a collision, in step ST5 (ST5: Y), the vehicle ECU 31 may cause the flow to proceed to step ST21.

In step ST21, the vehicle ECU 31 may start acquiring the occupant inside/outside information indicating the state of the occupant after the occurrence of the emergency, such as an accident.

In step ST22, the vehicle ECU 31 may acquire a vehicle inside captured image before the occurrence of the emergency, for example, an immediately preceding vehicle inside captured image. The vehicle ECU 31 may acquire the vehicle inside captured image of the vehicle inside camera 38 before the occurrence of the emergency involving the automobile 2. The vehicle inside captured image of the vehicle inside camera 38 in the past may be held in the vehicle memory 32. The vehicle ECU 31 may additionally acquire, from the vehicle memory 32, an occupant recognition result obtained by the occupant monitoring device 37 on the basis of the acquired vehicle inside captured image.

In step ST23, the vehicle ECU 31 may acquire a vehicle inside captured image after the occurrence of the emergency, for example, a latest vehicle inside captured image. The vehicle ECU 31 may acquire the vehicle inside captured image of the vehicle inside camera 38 after the occurrence of the emergency involving the automobile 2. The vehicle ECU 31 may additionally acquire, from the vehicle memory 32, an occupant recognition result obtained by the occupant monitoring device 37 on the basis of the vehicle inside captured image after the occurrence of the emergency.

In step ST24, the vehicle ECU 31 may determine whether there is an unrecognized occupant who has become absent inside the automobile 2. The vehicle inside camera 38 may image an occupant present inside the automobile 2 in the vehicle inside captured image. In a case where an occupant included in the vehicle inside captured image before the emergency is still included in the vehicle inside captured image after the emergency, the vehicle ECU 31 may determine that the occupant is present inside the vehicle. In a case where an occupant included in the vehicle inside captured image before the emergency is not included in the vehicle inside captured image after the emergency, the vehicle ECU 31 may determine that the occupant is not present, i.e., absent, inside the vehicle. In a case where the vehicle inside captured image before the emergency includes a plurality of occupants, the vehicle ECU 31 may determine the presence or absence inside the vehicle for each occupant. In determining such presence or absence of the occupant, the vehicle ECU 31 may use the occupant recognition result obtained by the occupant monitoring device 37.

If there is at least one occupant who has become absent inside the vehicle (ST24: Y), the vehicle ECU 31 may cause the flow to proceed to step ST25, assuming that there is an unrecognized occupant who has become absent inside the automobile 2.

If there is not even one occupant who has become absent inside the vehicle (ST24: N), the vehicle ECU 31 may end the process of acquiring the occupant inside/outside information, and cause the flow to proceed to step ST32, assuming that there is no unrecognized occupant who has become absent inside the automobile 2.

In step ST25, the vehicle ECU 31 may acquire a vehicle outside captured image after the occurrence of the emergency, for example, a latest vehicle outside captured image.

The vehicle outside camera 44 serving as the vehicle outside occupant detector may capture an image of the outside of the vehicle, e.g., the surroundings of the automobile 2, to generate the vehicle outside captured image. The vehicle ECU 31 may acquire the vehicle outside captured image after the occurrence of the emergency from the vehicle outside camera 44.

In step ST26, the vehicle ECU 31 may determine whether the absent occupant is present outside the vehicle.

The vehicle ECU 31 may extract a feature of the occupant, on the basis of an image component of the absent occupant included in the vehicle inside captured image before the emergency.

The vehicle ECU 31 may extract, as the feature of the absent occupant, a build, a silhouette, or a combination of clothing of the occupant. The feature of the occupant may be planar two-dimensional information or stereoscopic three-dimensional information. The vehicle ECU 31 may complement lacking information with, for example, information about the occupant registered in the vehicle memory 32, to obtain the feature of the absent occupant.

The vehicle ECU 31 may determine whether the vehicle outside captured image after the emergency includes an image component of a person matching the extracted feature. If the matching is determined on the basis of a feature of the front of the occupant's head in the determination, it is likely to be determined that the feature is not included just because, for example, the occupant facing backward is imaged in the vehicle outside captured image. Determining the matching on the basis of, for example, the build, the silhouette, or the combination of clothing of the occupant, as the feature of the occupant, makes it possible to prevent a case to be originally determined as matching from being missed.

If the vehicle outside captured image after the emergency includes an image component of a person matching the feature extracted for a person present inside the vehicle before the occurrence of the emergency, the vehicle ECU 31 may determine that the absent occupant is present outside the vehicle, and cause the flow to proceed to step ST27.

If the vehicle outside captured image after the emergency does not include an image component of a person matching the extracted feature, the vehicle ECU 31 may cause the flow to proceed to step ST31, because it is not possible to determine with certainty that the absent occupant is present outside the vehicle.

In step ST27, the vehicle ECU 31 may acquire door opening and closing information. If the door provided on the automobile 2 is opened and closed, the door opening and closing sensor 43 may detect the opening and closing. The vehicle memory 32 may hold, together with the time measured by the vehicle timer 35, a door opening and closing detection history obtained by the door opening and closing sensor 43. The vehicle ECU 31 may acquire the door opening and closing information from the vehicle memory 32.

In step ST28, the vehicle ECU 31 may determine whether the door has been opened and closed after the occurrence of the emergency.

The acceleration sensor 36 may detect an acceleration caused by collision of the automobile 2, for example. The vehicle memory 32 may hold, together with the time measured by the vehicle timer 35, a collision detection history obtained by the acceleration sensor 36. The vehicle ECU 31 may acquire the collision detection history from the vehicle memory 32.

The vehicle ECU 31 may compare a time of the acquired door opening and closing detection history with a collision detection time held in the vehicle memory 32, to determine whether opening and closing of the door have been detected after the collision detection time.

If opening and closing of the door have been detected after the collision detection time (ST28: Y), the vehicle ECU 31 may cause the flow to proceed to step ST29, assuming that the door has been opened and closed after the occurrence of the emergency.

If opening and closing of the door have not been detected after the collision detection time (ST28: N), the vehicle ECU 31 may cause the flow to proceed to step ST30, assuming that the door has not been opened or closed after the occurrence of the emergency.

In step ST29, the vehicle ECU 31 may determine that the occupant present outside the vehicle has voluntarily got out of the vehicle. Thereafter, the vehicle ECU 31 may cause the flow to proceed to step ST31.

In step ST30, the vehicle ECU 31 may determine that the occupant present outside the vehicle has been thrown out of the vehicle by collision, for example, instead of having voluntarily got out of the vehicle. Thereafter, the vehicle ECU 31 may cause the flow to proceed to step ST31.

In step ST31, the vehicle ECU 31 may generate and record, on the basis of the various determination results described above, the occupant inside/outside information indicating the state of the occupant after the occurrence of the emergency.

In the occupant inside/outside information, the state of each occupant after the occurrence of the emergency may include a case where the occupant stays inside the vehicle, a case where the occupant is present outside the vehicle by having voluntarily got out of the vehicle, and a case where the occupant is present outside the vehicle by having been thrown out of the vehicle. In this control described above, also included is a case where the occupant is missing, i.e., the occupant is not recognized as staying inside the vehicle, but it is not possible to determine with certainty that the occupant is present outside the vehicle.

The vehicle ECU 31 may generate, as the occupant inside/outside information, the determination result as to the state after the emergency for each occupant included in the vehicle inside captured image before the emergency.

The vehicle ECU 31 may record the generated occupant inside/outside information in the vehicle memory 32.

In step ST32, the vehicle ECU 31 may generate an emergency report.

In a case of executing step ST32 after the process of step ST24, the vehicle ECU 31 may generate an emergency report not including the occupant inside/outside information. The emergency report in this case may include information on the emergency involving the automobile 2. Non-limiting examples of the information on the emergency may include a type, a degree, an occurrence time, and a current location.

In contrast, in a case of executing step ST32 after the process of step ST31, the vehicle ECU 31 may generate an emergency report including the generated occupant inside/outside information. The occupant inside/outside information may include the determination result as to whether the occupant present inside the vehicle before the occurrence of the emergency involving the automobile 2 is present inside the vehicle or outside the vehicle after the emergency.

Thereafter, the vehicle ECU 31 may end this control, and cause the mobile communicator 33 to transmit the generated emergency report to the operator terminal 3 in step ST7.

FIG. 6 is an explanatory diagram illustrating the occupant inside/outside information assuming a case where only the driver is riding the automobile 2 and an emergency due to an accident occurs.

In FIG. 6, the first column represents an occupant who is recognized in a vehicle inside captured image before the accident. The second column represents an occupant who is recognized in a vehicle inside captured image after the accident. The third column represents a recognition result based on a vehicle outside captured image after the accident. The fourth column describes contents of the occupant inside/outside information.

FIG. 6 illustrates patterns 1 to 3.

In the pattern 1 of FIG. 6, the driver of the automobile 2 may be imaged and recognized in both the vehicle inside captured image before the accident and the vehicle inside captured image after the accident.

In this case, the vehicle ECU 31 may determine that there is not even one occupant who has become absent inside the vehicle in step ST24 in FIG. 5. The vehicle ECU 31 may generate an emergency report without generating the occupant inside/outside information, and transmit the emergency report to the operator terminal 3. The emergency report in this case may not include the occupant inside/outside information. However, in the pattern 1 of FIG. 6, the occupant inside/outside information indicating that the driver is present inside the vehicle may be described for comparison with other patterns. The emergency report that is transmitted to the operator terminal 3 may include such occupant inside/outside information. In addition, the vehicle ECU 31 may record such occupant inside/outside information in the vehicle memory 32.

In the pattern 2 of FIG. 6, the driver of the automobile 2 may be imaged and recognized in the vehicle inside captured image before the accident. However, the driver of the automobile 2 may not be imaged in the vehicle inside captured image after the accident, being absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. In the vehicle outside captured image after the accident, a person outside the vehicle and matching the driver may be recognized (matching with the driver).

In step ST31, the vehicle ECU 31 may accordingly generate the occupant inside/outside information indicating that the driver is present outside the vehicle, and record the occupant inside/outside information in the vehicle memory 32. The emergency report that is transmitted to the operator terminal 3 may include such occupant inside/outside information.

In the pattern 3 of FIG. 6, the driver of the automobile 2 may be imaged and recognized in the vehicle inside captured image before the accident. However, the driver of the automobile 2 may not be imaged in the vehicle inside captured image after the accident, being absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. However, in the vehicle outside captured image after the accident, a person outside the vehicle and matching the driver may not be recognized (no matching).

In step ST31, the vehicle ECU 31 may accordingly generate the occupant inside/outside information indicating that the driver is missing, and record the occupant inside/outside information in the vehicle memory 32. The emergency report that is transmitted to the operator terminal 3 may include such occupant inside/outside information.

FIG. 7 is an explanatory diagram illustrating the occupant inside/outside information assuming a case where the driver and the passenger are riding the automobile 2 and an emergency due to an accident occurs.

The first column to the fourth column of FIG. 7 may correspond to those of FIG. 6. In a pattern 11 of FIG. 7, the driver and the passenger of the automobile 2 may be imaged and recognized in both the vehicle inside captured image before the accident and the vehicle inside captured image after the accident.

In this case, the vehicle ECU 31 may determine that there is not even one occupant who has become absent inside the vehicle in step ST24 in FIG. 5. The vehicle ECU 31 may generate an emergency report without generating the occupant inside/outside information, and transmit the emergency report to the operator terminal 3. The emergency report in this case may not include the occupant inside/outside information. However, in the pattern 11 of FIG. 7, the occupant inside/outside information indicating that both the driver and the passenger are present inside the vehicle may be described for comparison with other patterns. The emergency report that is transmitted to the operator terminal 3 may include such occupant inside/outside information. In addition, the vehicle ECU 31 may record such occupant inside/outside information in the vehicle memory 32.

In a pattern 12 of FIG. 7, the driver and the passenger of the automobile 2 may be imaged and recognized in the vehicle inside captured image before the accident.

However, only the passenger of the automobile 2 may be imaged in the vehicle inside captured image after the accident, and the driver may be absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. In the vehicle outside captured image after the accident, a person outside the vehicle and matching the driver may be recognized (matching with the driver).

In step ST31, the vehicle ECU 31 may accordingly generate the occupant inside/outside information indicating that the passenger is present inside the vehicle and the driver is present outside the vehicle, and record the occupant inside/outside information in the vehicle memory 32. The emergency report that is transmitted to the operator terminal 3 may include such occupant inside/outside information.

In a pattern 13 of FIG. 7, the driver and the passenger of the automobile 2 may be imaged and recognized in the vehicle inside captured image before the accident. However, only the passenger of the automobile 2 may be imaged in the vehicle inside captured image after the accident, and the driver may be absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. However, in the vehicle outside captured image after the accident, a person outside the vehicle and matching the driver may not be recognized (no matching).

In step ST31, the vehicle ECU 31 may accordingly generate the occupant inside/outside information indicating that the passenger is present inside the vehicle and the driver is missing, and record the occupant inside/outside information in the vehicle memory 32. The emergency report that is transmitted to the operator terminal 3 may include such occupant inside/outside information.

FIG. 8 is an explanatory diagram illustrating the occupant inside/outside information including the opening and closing detection of the door of the automobile 2 assuming the case where the driver and the passenger are riding the automobile 2 and an emergency due to an accident occurs.

The first column to the third column and the fifth column of FIG. 8 may correspond to the first column to the fourth column of FIG. 6. The fourth column of FIG. 8 represents the door opening and closing history after the accident.

In a pattern 21 of FIG. 8, the driver and the passenger of the automobile 2 may be imaged and recognized in both the vehicle inside captured image before the accident and the vehicle inside captured image after the accident.

In this case, the vehicle ECU 31 may determine that there is not even one occupant who has become absent inside the vehicle in step ST24 in FIG. 5. The vehicle ECU 31 may generate an emergency report without generating the occupant inside/outside information, and transmit the emergency report to the operator terminal 3. The emergency report in this case may not include the occupant inside/outside information. However, in the pattern 21 of FIG. 8, the occupant inside/outside information indicating that both the driver and the passenger are present inside the vehicle may be described for comparison with other patterns. The emergency report that is transmitted to the operator terminal 3 may include such occupant inside/outside information. In addition, the vehicle ECU 31 may record such occupant inside/outside information in the vehicle memory 32.

In a pattern 22 of FIG. 8, the driver and the passenger of the automobile 2 may be imaged and recognized in the vehicle inside captured image before the accident. However, only the passenger of the automobile 2 may be imaged in the vehicle inside captured image after the accident, and the driver may be absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. In the vehicle outside captured image after the accident, a person outside the vehicle and matching the driver may be recognized (matching with the driver). In addition, the vehicle ECU 31 may determine, in the processes of step ST27 to step ST30, that the driver has voluntarily got out of the vehicle, on the basis of the presence of the opening and closing history of the door on the driver's seat side.

In step ST31, the vehicle ECU 31 may accordingly generate the occupant inside/outside information indicating that the passenger is present inside the vehicle and the driver has voluntarily got out of the vehicle, and record the occupant inside/outside information in the vehicle memory 32. The emergency report that is transmitted to the operator terminal 3 may include such occupant inside/outside information.

In a pattern 23 of FIG. 8, the driver and the passenger of the automobile 2 may be imaged and recognized in the vehicle inside captured image before the accident. However, only the passenger of the automobile 2 may be imaged in the vehicle inside captured image after the accident, and the driver may be absent.

In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. In the vehicle outside captured image after the accident, a person outside the vehicle and matching the driver may be recognized (matching with the driver). In addition, the vehicle ECU 31 may determine, in the processes of step ST27 to step ST30, that the driver has been thrown out of the vehicle, on the basis of the absence of the opening and closing history of the door on the driver's seat side.

In step ST31, the vehicle ECU 31 may accordingly generate the occupant inside/outside information indicating that the passenger is present inside the vehicle and the driver has been thrown out of the vehicle, and record the occupant inside/outside information in the vehicle memory 32. The emergency report that is transmitted to the operator terminal 3 may include such occupant inside/outside information.

In a pattern 24 of FIG. 8, the driver and the passenger of the automobile 2 may be imaged and recognized in the vehicle inside captured image before the accident. However, only the passenger of the automobile 2 may be imaged in the vehicle inside captured image after the accident, and the driver may be absent. In this case, the vehicle ECU 31 may determine that there is an occupant who has become absent inside the vehicle in step ST24 in FIG. 5, and may, in step ST25 and step ST26, check about the driver who is supposed to be present outside the vehicle on the basis of the vehicle outside captured image after the accident. However, in the vehicle outside captured image after the accident, a person outside the vehicle and matching the driver may not be recognized (no matching).

In step ST31, the vehicle ECU 31 may accordingly generate the occupant inside/outside information indicating that the passenger is present inside the vehicle and the driver is missing, and record the occupant inside/outside information in the vehicle memory 32. The emergency report that is transmitted to the operator terminal 3 may include such occupant inside/outside information.

By the emergency reporting control illustrated in FIG. 5, the vehicle ECU 31 may thus recognize an occupant present inside the vehicle before an emergency, determine where each occupant is present after the emergency, generate an emergency report including information on the determination result, and transmit the emergency report to the operator terminal 3.

Figure 9:
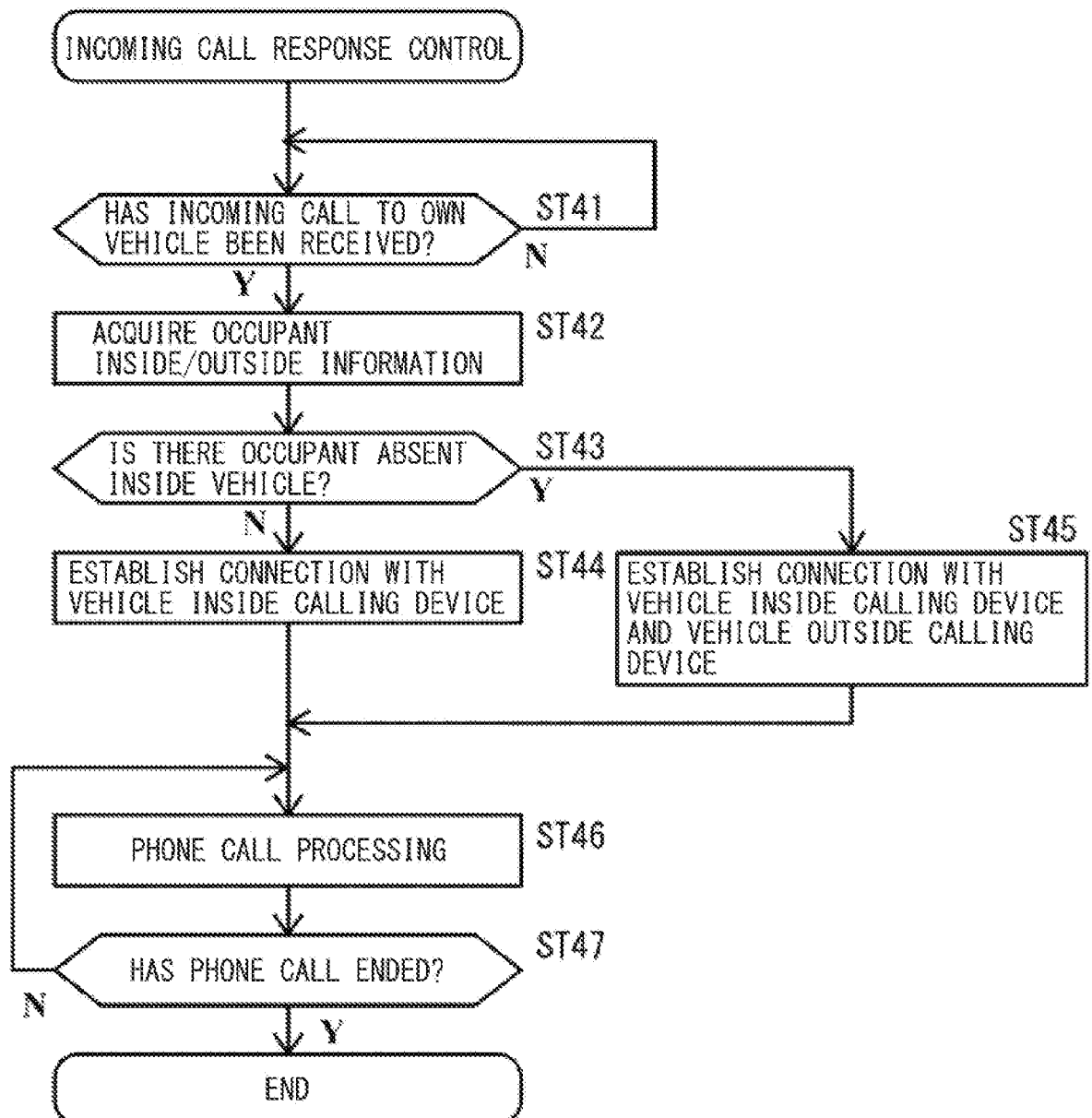
FIG. 9 is a flowchart illustrating incoming call response control that is performed by the control system of the automobile illustrated in FIG. 1.

FIG. 9 is a flowchart illustrating the incoming call response control that is performed by the control system 30 of the automobile 2 illustrated in FIG. 1.

If an incoming call is received from the operator terminal 3, the vehicle ECU 31 of the control system 30 of the automobile 2 may execute the incoming call response control illustrated in FIG. 9 in step ST8, as illustrated in FIG. 4.

The control system 30 of the automobile 2 may execute the incoming call response control illustrated in FIG. 9 only in a case where an emergency has occurred and the control system 30 has made an emergency report to the operator terminal 3.

In step ST41, the vehicle ECU 31 may determine whether the mobile communicator 33 has received an incoming call to the own vehicle.

After receiving an emergency report from the automobile 2, the operator terminal 3 may place, in the process of step ST12, an outgoing call to the automobile 2 that has transmitted the emergency report, as illustrated in FIG. 4. The mobile communicator 33 may receive this as an incoming call.

If the mobile communicator 33 has not received an incoming call to the own vehicle (ST41: N), the vehicle ECU 31 may repeat this process.

If the mobile communicator 33 receives an incoming call to the own vehicle (ST41: Y), the vehicle ECU 31 may cause the flow to proceed to step ST42.

In step ST42, the vehicle ECU 31 may acquire, from the vehicle memory 32, the occupant inside/outside information that has been recorded in transmitting the emergency report.

The vehicle ECU 31 may have generated the occupant inside/outside information and recorded the occupant inside/outside information in the vehicle memory 32 in step ST31 in FIG. 5. The vehicle ECU 31 may acquire this occupant inside/outside information from the vehicle memory 32.

In step ST43, the vehicle ECU 31 may determine, on the basis of the acquired occupant inside/outside information, whether there is an occupant who is absent inside the vehicle.

As represented by the various patterns described above, the occupant inside/outside information may include at least information on an occupant staying inside the vehicle, information on an occupant who has got out of the vehicle, and information on a missing occupant who is unrecognized both inside the vehicle and outside the vehicle. Note that the information on the occupant who has got out of the vehicle may include information on an occupant who has voluntarily got out of the vehicle and information on an occupant thrown out of the vehicle.

If the acquired occupant inside/outside information includes only information on an occupant inside the vehicle (ST43: N), the vehicle ECU 31 may determine that there is no occupant absent inside the vehicle, and cause the flow to proceed to step ST44.

If the acquired occupant inside/outside information includes at least one piece of information on an occupant other than an occupant inside the vehicle (ST43: Y), the vehicle ECU 31 may determine that there is an occupant absent inside the vehicle, and cause the flow to proceed to step ST45.

In step ST44, the vehicle ECU 31 may couple the mobile communicator 33 that has received the incoming call to the vehicle inside speaker 39 and the vehicle inside microphone 40 serving as the vehicle inside calling device.

Thus, in a case where an occupant is likely to be present inside the vehicle after the occurrence of the emergency, the vehicle ECU 31 may activate and use the vehicle inside calling device to enable a phone call to be made between an occupant inside the vehicle and the operator terminal 3, on the basis of a phone call connection request made by the incoming call placed from the operator terminal 3 to the mobile communicator 33.

Thereafter, the vehicle ECU 31 may cause the flow to proceed to step ST46.

In step ST45, the vehicle ECU 31 may couple the mobile communicator 33 that has received the incoming call to the vehicle inside speaker 39 and the vehicle inside microphone 40 serving as the vehicle inside calling device and to the vehicle outside speaker 45 and the vehicle outside microphone 46 serving as the vehicle outside calling device.

Thus, in a case where an occupant is likely to be present outside the vehicle after the occurrence of the emergency, the vehicle ECU 31 may activate and use the vehicle outside calling device together with the vehicle inside calling device to enable a phone call to be made between occupants inside the vehicle and outside the vehicle and the operator terminal 3, on the basis of the phone call connection request made by the incoming call placed from the operator terminal 3 to the mobile communicator 33. In one embodiment, the vehicle outside speaker 45 and the vehicle outside microphone 46 serving as the vehicle outside calling device may serve as "another calling device" provided on the automobile 2 toward the outside of the vehicle to allow for a phone call outside the vehicle.

Thereafter, the vehicle ECU 31 may cause the flow to proceed to step ST46.

In step ST46, the vehicle ECU 31 may execute phone call processing with the operator terminal 3 through the mobile communicator 33.

The vehicle ECU 31 may output phone call voice data of the operator received from the operator terminal 3 by the mobile communicator 33 to, for example, the vehicle inside speaker 39 and the vehicle outside speaker 45. This enables the operator's voice to be played inside and outside the automobile 2.

In addition, the vehicle ECU 31 may collect voice data from the vehicle inside microphone 40 and the vehicle outside microphone 46, and output the voice data to the mobile communicator 33. The mobile communicator 33 may transmit the voice data to the operator terminal 3 with which connection is established by the incoming call. The operator terminal 3 may output the received voice data. In a case where the voice data collected from the vehicle inside microphone 40 and the vehicle outside microphone 46 includes an occupant's voice, the voice may be played from the operator terminal 3. This enables the occupant to talk with the operator by phone, regardless of whether the occupant is present inside the automobile 2 or outside the automobile 2.

In step ST47, the vehicle ECU 31 may determine whether the phone call with the operator terminal 3 has ended.

For example, the operator may perform a phone call end operation on the operator terminal 3. Phone call end information may thus be transmitted from the operator terminal 3 to the mobile communicator 33.

If the mobile communicator 33 has not received the phone call end information (ST47: N), the vehicle ECU 31 may cause the flow to return to step ST46, and keep the phone call between the operator and the occupant.

If the mobile communicator 33 receives the phone call end information (ST47: Y), the vehicle ECU 31 may determine that the phone call with the operator terminal 3 has ended, and end this control.

As described above, in the example embodiment, the automobile 2 with the emergency reporting function includes the mobile communicator 33, and the vehicle inside speaker 39 and the vehicle inside microphone 40 (i.e., the vehicle inside calling device). The mobile communicator 33 is configured to be coupled to the operator terminal 3 to transmit an emergency report that is generated by the vehicle ECU 31 serving as the processor. The vehicle inside speaker 39 and the vehicle inside microphone 40 are provided in the automobile 2 to be used by an occupant present inside the vehicle. The vehicle ECU 31 generates the emergency report to be transmitted to the operator terminal 3 in a case where the automobile 2 is involved in an emergency. The vehicle ECU 31 determines, on the basis of the detection by the vehicle inside camera 38 and the vehicle outside camera 44, whether an occupant who has been present inside the vehicle before occurrence of the emergency is present inside the vehicle or outside the vehicle after the occurrence of the emergency. In a case where the occupant is likely to be present outside the vehicle after the occurrence of the emergency, the vehicle ECU 31 activates the vehicle outside speaker 45 and the vehicle outside microphone 46 (i.e., the vehicle outside calling device), together with the vehicle inside speaker 39 and the vehicle inside microphone 40 (i.e., the vehicle inside calling device), to enable a phone call to be made between an occupant present outside or inside the vehicle and the operator, on the basis of the phone call connection request from the operator terminal 3 to the mobile communicator 33. The vehicle outside speaker 45 and the vehicle outside microphone 46 allow for a phone call outside the vehicle. In a case where the occupant is likely to be present inside the vehicle after the occurrence of the emergency, the vehicle ECU 31 activates only the vehicle inside speaker 39 and the vehicle inside microphone 40 (i.e., the vehicle inside calling device) to enable a phone call to be made between an occupant present inside the vehicle and the operator, on the basis of the phone call connection request from the operator terminal 3 to the mobile communicator 33.

Thus, in a case where the occupant is present outside the vehicle after the occurrence of the emergency, the operator terminal is able to establish a phone call connection with the vehicle outside speaker 45 and the vehicle outside microphone 46 (i.e., the vehicle outside calling device), together with the vehicle inside speaker 39 and the vehicle inside microphone 40 (i.e., the vehicle inside calling device). The vehicle outside speaker 45 and the vehicle outside microphone 46 allow for a phone call outside the vehicle. Even if the occupant is present outside the vehicle after the occurrence of the emergency, the operator is able to talk by phone with the occupant, present outside the vehicle, of the automobile 2 involved in the emergency.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing example embodiment, in a case where the occupant is likely to be present outside the vehicle after the occurrence of the emergency, the vehicle ECU 31 activates the vehicle outside speaker 45 and the vehicle outside microphone 46 (i.e., the vehicle outside calling device), together with the vehicle inside speaker 39 and the vehicle inside microphone 40 (i.e., the vehicle inside calling device), to enable a phone call to be made between an occupant present outside the vehicle and the operator.

In another example, the vehicle ECU 31 may activate the short-range communication device 47, in place of or together with the vehicle outside speaker 45 and the vehicle outside microphone 46 (i.e., the vehicle outside calling device) provided on the automobile 2, to enable a phone call to be made between an occupant present outside the vehicle and the operator by means of the occupant terminal 49. The occupant terminal 49 may be possessed by the occupant and included in the connection destination list data indicating the occupant terminal 49 with which the short-range communication device 47 is able to communicate.

Each of the CPU 11 illustrated in FIG. 2 and the vehicle ECU 31 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 11 and the vehicle ECU 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the CPU 11 illustrated in FIG. 2 and the vehicle ECU 31 illustrated in FIG. 3.

The invention claimed is:

1. A vehicle with an emergency reporting function, the vehicle comprising:
 a processor configured to generate an emergency report to be transmitted to an operator terminal in a case where an emergency involving the vehicle occurs;
 a vehicle communication device configured to be coupled to the operator terminal to transmit the emergency report generated by the processor;
 a first calling device provided in the vehicle to be used by an occupant present inside the vehicle; and
 a vehicle outside occupant detector configured to perform detection that an occupant of the vehicle is present outside the vehicle, wherein
 the processor is configured to
  on a basis of the detection by the vehicle outside occupant detector, perform determination as to whether an occupant who has been present inside the vehicle before occurrence of the emergency is present inside the vehicle or outside the vehicle after the occurrence of the emergency,
  use the first calling device to enable a communication between an occupant inside the vehicle and the operator terminal, in a case where the occupant who has been present inside the vehicle before the occurrence of the emergency is present inside the vehicle after the occurrence of the emergency, and
  use a second calling device, together with the first calling device, to enable a communication between an occupant present outside or inside the vehicle and the operator terminal, in a case where the occupant who has been present inside the vehicle before the occurrence of the emergency is present outside the vehicle after the occurrence of the emergency, the second calling device being configured to allow for a communication outside the vehicle.

2. The vehicle with the emergency reporting function, according to claim 1, further comprising a vehicle inside imaging device configured to capture an image of inside of the vehicle, wherein
 the vehicle outside occupant detector comprises a vehicle outside imaging device configured to capture an image of outside of the vehicle, and the processor is configured to
- determine, on a basis of an image captured by the vehicle inside imaging device before the occurrence of the emergency an occupant who is present inside the vehicle before the occurrence of the emergency,
- determine, on a basis of an image captured by the vehicle inside imaging device after the occurrence of the emergency, an occupant who has become absent inside the vehicle after the occurrence of the emergency, and
- determine, on a basis of an image captured by the vehicle outside imaging device, that the occupant who has become absent inside the vehicle is present outside the vehicle.

3. The vehicle with the emergency reporting function, according to claim 2, wherein the processor is configured to determine that the occupant who has become absent inside the vehicle is present outside the vehicle, by determining matching with a build, a silhouette, or a combination of clothing of the occupant, on the basis of the image captured by the vehicle outside imaging device.

4. The vehicle with the emergency reporting function, according to claim 1, wherein the processor is configured to, after performing determination as to whether the occupant who has been present inside the vehicle before the occurrence of the emergency is present inside the vehicle or outside the vehicle after the occurrence of the emergency, generate an emergency report including a result of the determination, and cause the vehicle communication device to transmit the emergency report to the operator terminal.

5. The vehicle with the emergency reporting function, according to claim 2, wherein the processor is configured to, after performing determination as to whether the occupant who has been present inside the vehicle before the occurrence of the emergency is present inside the vehicle or outside the vehicle after the occurrence of the emergency, generate an emergency report including a result of the determination, and cause the vehicle communication device to transmit the emergency report to the operator terminal.

6. The vehicle with the emergency reporting function, according to claim 3, wherein the processor is configured to, after performing determination as to whether the occupant who has been present inside the vehicle before the occurrence of the emergency is present inside the vehicle or outside the vehicle after the occurrence of the emergency, generate an emergency report including a result of the determination, and cause the vehicle communication device to transmit the emergency report to the operator terminal.

7. The vehicle with the emergency reporting function, according to claim 1, further comprising an opening and closing detection device configured to detect opening and closing of a door or a window of the vehicle, the door or the window being used when an occupant gets out of the vehicle, wherein,
- in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

8. The vehicle with the emergency reporting function, according to claim 2, further comprising an opening and closing detection device configured to detect opening and closing of a door or a window of the vehicle, the door or the window being used when an occupant gets out of the vehicle, wherein,
- in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

9. The vehicle with the emergency reporting function, according to claim 3, further comprising an opening and closing detection device configured to detect opening and closing of a door or a window of the vehicle, the door or the window being used when an occupant gets out of the vehicle, wherein,
- in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

10. The vehicle with the emergency reporting function, according to claim 4, further comprising an opening and closing detection device configured to detect opening and closing of a door or a window of the vehicle, the door or the window being used when an occupant gets out of the vehicle, wherein,
- in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

11. The vehicle with the emergency reporting function, according to claim 5, further comprising an opening and closing detection device configured to detect opening and closing of a door or a window of the vehicle, the door or the window being used when an occupant gets out of the vehicle, wherein,
- in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

12. The vehicle with the emergency reporting function, according to claim 6, further comprising an opening and closing detection device configured to detect opening and closing of a door or a window of the vehicle, the door or the window being used when an occupant gets out of the vehicle, wherein,
    in a case where the opening and closing detection device has detected the opening and closing of the door or the window of the vehicle after the occurrence of the emergency, the processor is configured to determine that an occupant present outside the vehicle has voluntarily got out of the vehicle, generate an emergency report including a determination result as to whether the occupant present outside the vehicle has voluntarily got out of the vehicle or has been thrown out of the vehicle, and cause the vehicle communication device to transmit the emergency report to the operator terminal.

* * * * *